United States Patent [19]

Arends et al.

[11] 4,242,111
[45] Dec. 30, 1980

[54] COMPRESSED AIR DRYER

[76] Inventors: Andrew Arends; Gary W. Arends; George Spector, all c/o George Spector, 3615 Woolworth Bldg., 233 Broadway, New York, N.Y. 10007

[21] Appl. No.: 21,017
[22] Filed: Mar. 16, 1979
[51] Int. Cl.³ ............................................. B01D 50/00
[52] U.S. Cl. ........................................ 55/269; 55/323; 55/332; 55/462; 55/DIG. 17
[58] Field of Search ................ 55/269, 321, 323, 329, 55/332, 462, 464, 482, 525, DIG. 17; 165/138, DIG. 18; 62/93

[56] References Cited

U.S. PATENT DOCUMENTS

| 2,952,331 | 9/1960 | Beach | 55/323 |
| 2,992,698 | 7/1961 | Pearson et al. | 55/321 |
| 3,274,755 | 9/1966 | Montagnon et al. | 55/269 |
| 3,304,696 | 2/1967 | McKenna | 62/93 |
| 3,396,515 | 8/1968 | Wright | 55/323 |
| 3,878,594 | 4/1975 | Minor, Jr. | 55/525 |
| 3,963,466 | 6/1976 | Hynes | 55/269 |

FOREIGN PATENT DOCUMENTS 20345 of 1910 United Kingdom ................... 55/329

Primary Examiner—David L. Lacey

[57] ABSTRACT

An appliance for attachment to a compressed air line leading from an air compressor, the appliance including a container containing an interchangeable waste dryer made of remnant fabrics and through which the air passes so that moisture from the air is absorbed thereby, and the appliance, in another model thereof, additionally including a water cooled tubes so to cool the passing air and condense the moisture therefrom.

1 Claim, 2 Drawing Figures

U.S. Patent     Dec. 30, 1980     4,242,111
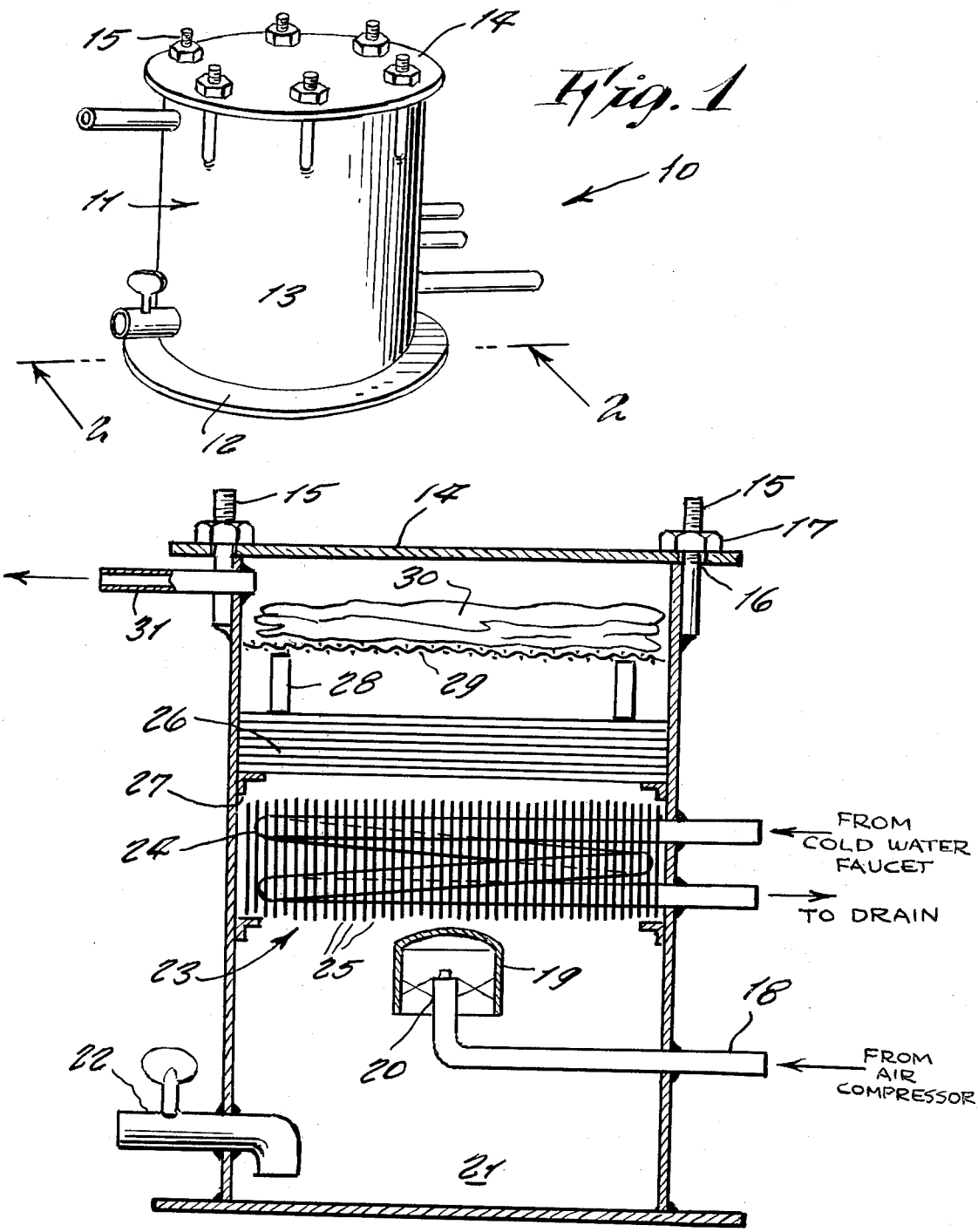

COMPRESSED AIR DRYER

This invention relates generally to dehumidifying devices.

It is well known to many persons involved in use of tools powered by compressed air, that in humid climates such compressed air carries the moisture into the tool and shortens the life thereof, or else interferes in other situations where dry air is desired, such as in paint spraying operations. This is objectionable so that this situation is therefore in want of an improvement.

Accordingly, it is a principal object of the present invention to provide a dehumidifying device which is designed particularly to dry compressed air.

Another object is to provide a compressed air dryer which eliminates damaging moisture entering air operated tools, and eliminates damaging moisture mixing with oil paints or the like.

Still another object is to provide a compressed air dryer which has no moving parts to wear out, so is simple in design and inexpensive to manufacture.

FIG. 1 is a perspective view of the invention.

FIG. 2 is an enlarged cross sectional view taken on 2—2 of FIG. 1 showing various details of the device.

Referring now to the drawing in greater detail, the reference numeral 10 represents a compressed air dryer according to the present invention wherein there is a canister 11 comprised of a flat bottom wall 12 and cylindrical side wall 13. A removable cover 14 is secured upon an open top of the canister by means of bolts 15, welded around the canister, extending upward through holes 16 in the cover and being fitted with nuts 17 that clamp the cover tightly against the canister upper edge.

An air intake pipe 18 is welded through a lower portion of the side wall and which is attachable to a line from an air compressor. The inner end of the pipe is upwardly turned and fits inside an inverted splatter cup 19 so that outlet orfices 20 around the pipe end direct the compressed air against the inner side wall surface of the cup. The increased pressure of the air passing through the orfices, followed by splattering with force against the cup, will cause possibly 90 percent of the moisure to separate from the air and drop down into a sump 21 formed in a lower end of the canister from where the accumulated water may be periodically drained by means of a petcock 22. The air then moves upwardly around the cup and through a radiator 23 that cools the air so to condense the moisture remaining therein, the moisture falling as drops down into the sump.

The radiator is comprised of a coil 24 connectable at one end to a cold water supply, and attachable at its other end to a drain. Fins 25, attached to the coil, transmit a cool temperature to the air as it travels between the fins.

Above the radiator, the air travels through an aluminum screen filter 26 resting on angle supports 27, the filter removing foreign particles.

Spacers 28 supported upon the screen, hold up a wire mesh 29 upon which a water dryer 30 is removably placed and is comprised of remnant rags that additionally catch moisture as the air travels up therethrough toward an outlet pipe 31.

Periodically, during humid weather, the petcock is opened so to drain out accumulated water from the sump. Also the top cover is removed so to replace the water dryer with fresh dry rags.

In a modified design the radiator is eliminated from the construction.

What is claimed:

1. A compressed air dryer, comprising in combination, a canister having a removable cover closing an open upper end thereof, an inlet pipe having an upturned portion positioned in a lower end of said cannister, an outlet pipe positioned near an upper end of said canister, and means inside said canister for dehumidifying air moving through said pipes, said means including an inverted splatter cup mounted over said upturned portion of said inlet pipe, said cup including a side wall encompasing and extending below said portion, coiled finned cooling tubes mounted above said cup for cooling the air and condensing the moisture in the air, a screen filter mounted above said tubes, spacers mounted on said filter, wire mesh supported by said spacers above said screen filter and a cloth remnant on said mesh, said outlet pipe being located above said mesh and remnant.

* * * * *